2,884,528
Patented Apr. 28, 1959

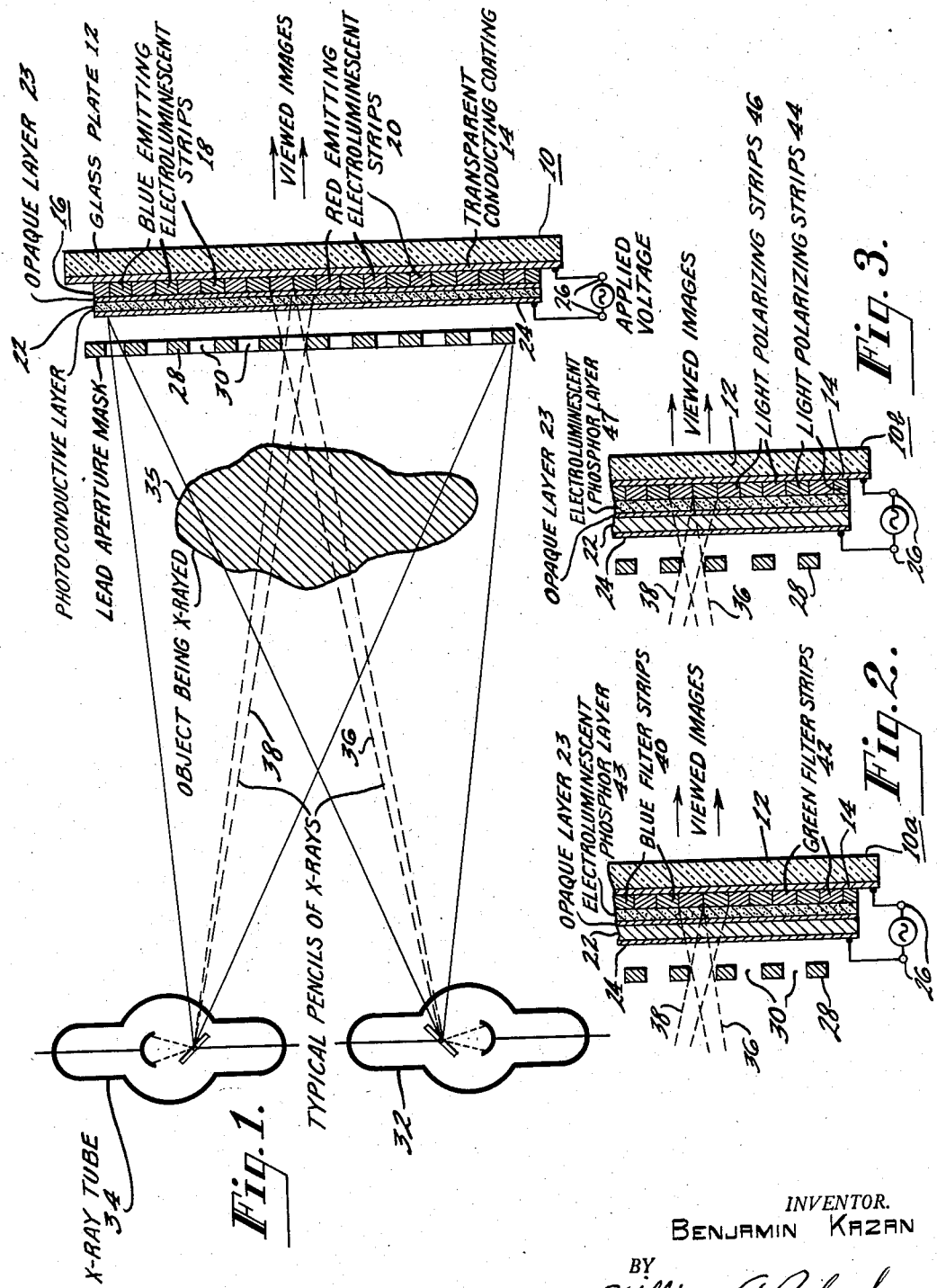

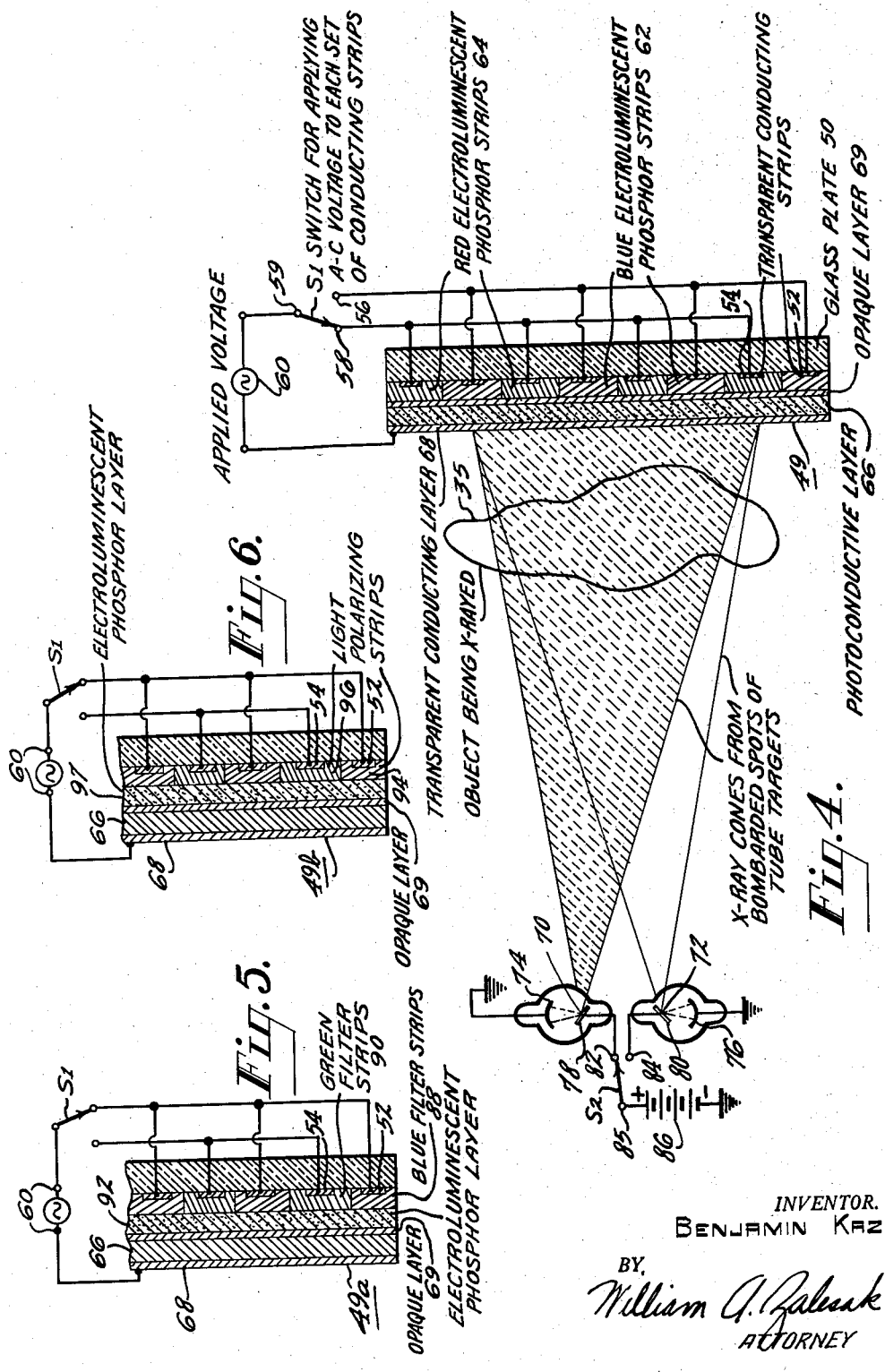

2,884,528

STEREOSCOPIC X-RAY INTENSIFICATION

Benjamin Kazan, Princeton, N.J., assignor to Radio Corporation of America, a corporation of Delaware Application March 5, 1956, Serial No. 569,310

10 Claims. (Cl. 250—60)

This invention relates to stereoscopic X-ray image production, and particularly to the intensification of such images for use in medical or industrial applications.

Stereoscopic X-ray image devices are known in which the images for viewing are produced by X-ray bombardment of a fluorescent screen. However, the images produced by such means are too dim to enable the human eye to see sufficient detail for depth perception. To obtain brighter images by using stronger X-rays would dangerously expose the patient, the examining physician, or technician.

Accordingly, an object of this invention is to provide means for visually observing stereoscopic X-ray images in more clear and intensified form without using stronger X-rays.

A further object is to provide means for converting low level X-ray images to intensified visual images in stereoscopic form.

The foregoing and other objects are achieved in accordance with the invention by providing apparatus comprising screen means including two superposed layers, one of the layers including a material having a variable impedance characteristic in response to X-ray excitation, the other of said layers including electroluminescent phosphor material, and means including a voltage source for impressing an electric field across said layers. In combination with said screen means are X-ray producing means arranged to project on said variable impedance layer two X-ray images formed by different angular projections of said X-rays on a specimen. Means are also provided for rendering the X-ray images distinctly visible on said electroluminescent material with the details of said images displaced relative to each other.

In one embodiment, two X-ray images are simultaneously projected on the screen from two different angles and through a multi-apertured masking member supported in front of the screen. The apertures are arranged so that each image on passing through the mask will excite the variable impedance layer in strips separated by strips of non-excited areas. The areas excited by one image coincide with the non-excited areas of the other image, and the non-excited areas of the one image coincide with the excited areas of the other image. Thus two images, with their details displaced, are rendered visible on the corresponding areas of electroluminescent layer. In order for each eye of the observer to see a different one of the two images, means are provided for reproducing the two images in different colors or polarizations of light, so that the viewer when provided with an appropriate color or polarizing filter over each eye may obtain a stereoscopic effect.

In the drawing:

Fig. 1 is a schematic view of one form of apparatus illustrating the invention and utilizing one type of screen means;

Fig. 2 is a schematic view of another type of screen means for use in the apparatus of Fig. 1;

Fig. 3 is a schematic view of still another type of screen means for use in the apparatus of Fig. 1;

Fig. 4 is a schematic view of another form of apparatus illustrating the invention and utilizing another type of screen means;

Fig. 5 is a schematic view of still another type of screen means for use in the appartus of Fig. 4; and Fig. 6 is a schematic view of still another type of screen means for use in the apparatus of Fig. 4.

Referring to Fig. 1, which shows schematically one form of apparatus for producing intensified stereoscopic X-ray images, there is shown a screen 10 which includes a light transparent base 12, such as a sheet of glass or plastic, having a surface thereof coated with a light transparent electrically conductive layer or film 14 such as tin chloride, tin oxide, silver, or gold, for example. A layer of electroluminescent phosphor material 16 is laid down over the transparent conductive film 14. The electroluminescent layer 16 is shown laid down as two sets of parallel electroluminescent phosphor strips 18 and 20 in alternate array. One set of electroluminescent strips 18 emits light of one color, for example blue, and the other set 20 emits light of a different color, for example red. An example of a blue emitting electroluminescent phosphor is copper activated zinc sulfide. An example of a red emitting electroluminescent phosphor is copper activated zinc sulfo-selenide (Zn(S:Se):Cu); such a phosphor is disclosed in copending applications of Simon Larach and Robert Mazo, Serial Nos. 394,646 and 394,647, filed November 27, 1953, the latter application now U.S. Patent No. 2,847,386. Each of the electroluminescent phosphors may be mixed with a transparent dielectric binder, such as ethyl cellulose or polystyrene, for example. Other electroluminescent phosphors may be used which emit other colors, so long as the two emission colors are different. Superposed on the electroluminescent strips 18 and 20 is a layer 22 of a material having a variable impedance characteristic in response to X-ray excitation. In general, this is one of the materials selected from the class known as photoconductive materials. Suitable materials for the variable impedance layer 22 are cadmium sulfide, or cadmium selenide. If desired, a layer of opaque insulating material 23, such as a layer of black lacquer, may be interposed between the variable impedance layer 22 and the electroluminescent strips 18 and 20 for the prevention of light feedback from the electroluminescent strips 18 and 20 to the variable impedance layer 22. The opaque layer 23 may be omitted if selection is made of materials for the variable impedance layer 22 and the electroluminescent phosphor strips 18 and 20 such that the variable impedance layer 22 is sensitive to X-rays but relatively insensitive to the light emitted by the electroluminescent phosphors. An electrically conductive layer 24 is superposed on the variable impedance layer 22. The conductive layer 24 may be made of silver, aluminum, or any other metal applied thin enough to be transparent to X-rays. The conductive layer 24 and transparent conductive film 14 are connected across a voltage source 26, which may for example, be of the order of 600 volts alternating current having a frequency in the range of about 400–1000 cycles per second.

An aperture mask 28, made of material, for example, lead, which is opaque to X-rays, is supported adjacent to the variable impedance layer 22 side of the screen 10. The mask 28 has elongated apertures or slits 30 which extend parallel to the electroluminescent strips 18 and 20, the number of apertures being equal to the number of strips in each set.

A pair of spaced apart X-ray tubes 32 and 34, located at some distance away from the screen 10 are arranged to project X-rays from two different angular directions through a specimen 35 and onto the screen 10. The alignment and spacing of the apertures 30 of the mask 28 from screen 10 is such that X-rays from one tube 32, as exemplified by the X-ray pencil 36, impinge only on the areas of the variable impedance layer 22 registered with the red light emitting electroluminescent phosphor strips 20, these same X-rays being masked off from the areas of the variable impedance layer 22 registered with the blue light emitting strips 18. Similarly, by proper positioning of the other tube 34, X-rays, as exemplified by the X-ray pencil 38, impinge only on the areas of the variable impedance layer registered with the blue light emitting strips 18, and they are masked from the areas of the variable impedance layer 22 registered with the red light emitting strips 20. The mask 28 therefore permits two different aspects of the X-rayed specimen 35 to be projected on the variable impedance layer 22, each aspect being permitted to excite only selected areas of the variable impedance layer.

In the absence of X-rays incident on the variable impedance layer 22, the impedance of this layer 22 is substantially higher than the impedance of the electroluminescent layer 16 so that only a small faction of the voltage supplied by the source 26 appears across the electroluminescent layer 16, and the electroluminescent layer will not emit light. The desired impedance ratio may be obtained by adjusting the relative thicknesses of the layers. For example, if the electroluminescent layer 16 is one mil thick and the variable impedance layer 22 is 10 mils thick, the ratio of voltages respectively, is about 1 to 11, when the variable impedance layer 22 is unexcited by the X-rays.

In operation, it may be desirable to adjust the magnitude of the supply voltage 26 so that the electroluminescent layer 16 is just below threshold voltage for electroluminescence with no X-ray excitation of the variable impedance layer 22. A slight increase in the voltage appearing across the electroluminescent layer 16 will thus produce visible light. When the pencil of X-rays 36, for example, strikes an area of the variable impedance layer 22, the impedance of the layer 22 drops in that area by an amount corresponding to the intensity of the X-rays. Correspondingly, a decrease in the voltage appearing across the variable impedance layer 22 and an increase in the voltage appearing across the red light emitting trip 20 directly behind the X-ray excited area is produced, so that a red spot is visible on the electroluminescent layer 16. Therefore, a pattern of X-rays, or an X-ray image, which results from X-rays from tube 32 passing through the specimen 35 at one angle and through the mask 28 will be reproduced visibly by the red emitting electroluminescent strips 20 and only these strips, as a red light image. The red image is representative of one aspect of the specimen 35. Similarly, the pattern of X-rays resulting from the interception by the specimen 35 of X-rays from tube 34 is reproduced visibly as a blue light image by the blue light emitting electroluminescent strips 18. The blue image is representative of a different aspect of the specimen 35. The two different color images have their details displaced on the screen 10 because the X-rays which produce them emanate from two different points or angles. An observer equipped with the appropriate color filter over each eye, for example, a blue light transmitting color filter over one eye, and a red light transmitting color filter over the other eye, will obtain a stereoscopic or 3 dimensional effect, by virtue of the fact that one eye will see only the blue image and the other eye will see only the red image.

The light images produced on the screen 10 are intensified images, the intensification being made possible by the additional energy derived from the voltage source 26. Hence, relatively weak X-ray images will be produced as intensified light images having sufficient brightness to enable the human eye to see sufficient detail for depth perception.

Modified screen structures may be used in place of the screen 10 in the apparatus of Fig. 1. Referring to Fig. 2, one type of modified screen 10a is shown in which the electroluminescent strips are omitted, and in their place two sets of color filter strips 40 and 42 are laid down on the transparent conductive layer 14, and a layer of electroluminescent phosphor 43, which has a broad spectral emission, is sandwiched as a single body between the filter strips 40, 42 and the variable impedance layer 22. The opaque layer 23, if used, is sandwiched between the variable impedance layer 22 and electroluminescent layer 43. The filter strips 40, 42 extend parallel to the apertures 30 of the mask 28. One set of filters 40 may be blue transmitting and the other filters 42 may be green transmitting. X-rays 36 from source 32 of Fig. 1 for example, will excite those areas of the variable impedance layer 22 registered with the blue filter strips 42 and cause the electroluminescent layer 43 to emit light from its associated areas, also registered with the blue filter strips 42. All of the electroluminescent light except the blue light will be filtered out by the blue filter strips 42, so as to produce a blue image on the viewing side. Similarly, X-rays 38 from source 34 of Fig. 1 will excite those areas of the variable impedance layer 22 registered with the green filter strips 40 and cause the electroluminescent layer 43 to emit light from its associated areas, also registered with the green filter strips 40. All of the electroluminescent light except the green light will be filtered out by the green filter strips 40, so as to produce a green image on the viewing side. An observer equipped with a green filter over one eye and a blue filter over the other eye will obtain a stereoscopic effect.

In the modified screen structure 10b shown in Fig. 3, two sets of light polarizing strips 44 and 46 are laid down on the transparent conductive layer 14, and a layer of electroluminescent phosphor 47 of any desired color emission is sandwiched as a single body between the light polarizing strips 40, 46 and the variable impedance layer 22. The light polarizing strips extend parallel to the apertures of the mask 28. The strips 44 polarize light in one direction and the strips 46 polarize light in another direction perpendicular to the first direction. X-rays 36 from source 32 of Fig. 1 for example, will excite those areas of the variable impedance layer 22 registered with the polarizing strips 46 and cause the electroluminescent layer 47 to emit light from its associated areas also registered with the strips 46. The electroluminescent light passing through the strips 46 will be polarized in one direction to produce a light image of one plane of polarization. Similarly, X-rays 38 from source 34 of Fig. 1 will excite those areas of the variable impedance layer 22 registered with the light polarizing strips 44 and cause the electroluminescent layer 47 to emit light from its associated areas also registered with the strips 44. The electroluminescent light passing through the strips 44 will be polarized in a different direction to produce a light image of a different plane of polarization from the first image. An observer equipped with the proper light polarizing filter over each eye will obtain a stereoscopic effect.

Fig. 4 shows an apparatus for producing intensified stereoscopic X-ray images in which the masking member 28 of Figs. 1–3 is dispensed with. In Fig. 4, a screen 49 includes a transparent support, or glass plate 50 having one surface thereof coated with two sets of spaced apart transparent conductive strips 52 and 54 extending in a direction normal to the plane of the paper. The strips 52 of one set are connected together electrically and are intermeshed with the other set of strips 54, also connected together electrically. Each set of strips 52, 54 is connected to a separate pole 56 and 58 respectively of a switch $S_1$, the common terminal 59 of which is connected to one side of a voltage source 60.

Two sets of electroluminescent phosphor strips 62 and 64 are laid down side by side and in alternate array over the conductive strips 52, 54. The electroluminescent phosphor strips 62 are in contact with the conductive strips 52, and the other electroluminescent phosphor strips 64 are in contact with the other conductive strips 54. The two sets of electroluminescent phosphor strips emit different color light. Strips 62 may emit blue light and strips 64 may emit red light, for example. A layer 66 of a material whose impedance is variable in response to X-ray excitation is supported on the electroluminescent phosphor strips 62, 64. The other side of the variable impedance layer 66 is covered with a conductive layer 68 which is transparent to X-rays. An opaque insulating layer 69 may be interposed between the variable impedance layer 66 and the electroluminescent strips 62, 64.

The two X-ray sources 70 and 72 located at some distance away from the screen 49 have their cathodes 74, 76 grounded and their anodes 78, 80 brought out separately to poles 82, 84 of a switch $S_2$, the common terminal 85 of which is connected to a high voltage supply 86.

In operation, the voltage source 60 is periodically switched from one set of conductive strips 52 to the other set of conductive strips 54 in sequence with the periodic switching of the X-ray sources 70 and 72. For example, assume the strips 54 in contact with the red emitting electroluminescent strips 64 to be energized at the same time that X-ray source 70 is energized, as shown. These X-rays will be intercepted by the specimen 35, and the X-rays penetrating therethrough will strike the variable impedance layer 66. Only the red light emitting electroluminescent strips 64 will emit light, and the blue light emitting electroluminescent strips 62 will remain dark since the conductive strips 52 in contact therewith are not energized. Hence, a red light image will be visible on the screen 49.

In the next instant of time, switch $S_1$ is moved from position 58 to position 56, and simultaneously therewith switch $S_2$ is moved from position 82 to position 84. This switching de-energizes conductive strips 54 and X-ray source 70 and energizes conductive strips 52 and X-ray source 72. X-rays emanating from source 72, which is displaced from source 70, now penetrate the specimen 35 from a different direction than the first and strike the variable impedance layer 66. Only the blue light emitting electroluminescent strips 62 will emit light this time, and a blue light image will be visible on the screen 49.

Assuming the above switching process to take place at intervals of about 1/30 second, with the variable impedance layer having a speed of response equal to this or shorter, two electroluminescent light images will be produced on the screen 49 corresponding to the X-ray pattern of the specimen. These two images will be of different color, red and blue in the example described, with their details somewhat displaced in varying amounts from each other due to the fact that they are produced by X-ray sources located at two different points. The observation of the two electroluminescent pictures by an observer equipped with an appropriate filter over each eye, for example, so that one eye can see only the red electroluminescent image and the other eye only the blue image, will produce a stereoscopic or 3-dimensional effect, providing to the observer information of the relative position in depth of the various parts of the specimen being X-rayed.

Modified screen structures may be used in place of the screen 49 in the apparatus of Fig. 4. Referring to Fig. 5 one type of modified screen 49a is shown in which the electroluminescent strips are omitted, and in their place two sets of color filter strips 88 and 90 are laid down on the conductive strips 52 and 54 respectively, and a layer of electroluminescent phosphor 92 which has a broad spectral emission is sandwiched as a single body between the filter strips 88, 90 and the variable impedance layer 66. One set of filters 88 may be blue light transmitting and the other filters 90 may be green light transmitting.

Upon simultaneous X-ray excitation of the variable impedance layer 66 and energization of the conductive strips 52, electroluminescence of the electroluminescent layer 92 will be produced only from those phosphor strips in contact with the conductive strips 52. The light passing through the blue filters 88 will be visible as a blue light image. Similarly, when the other X-ray source and the other conductive strips 54 are switched on, electroluminescence of the electroluminescent layer 92 will be produced only in those areas in contact with the conductive strips 54. The light passing through the green filter strips 90 will be visible as a green image. The observer may separate the two images by using appropriate color filters as before.

In the screen structure 49b shown in Fig. 6 the electroluminescent strips are again omitted and in their place two sets of light polarizing strips 94 and 96 are laid down on the transparent conductive strips 52 and 54, and a layer of electroluminescent phosphor 97 which has any desired color emission is sandwiched as a single body between the light polarizing strips 94, 96 and the variable impedance layer 66. The strips 94 polarize light in one direction or plane, and the strips 96 polarize in another direction or in a plane normal to the light in the first plane. Upon X-ray excitation of the variable impedance layer 66, and with the conductive strips 52 energized, electroluminescence of the electroluminescent layer 97 will be produced only in those areas substantially in registry with the conductive strips 52. Light passing through the polarizing strips 94 will be polarized in one plane of polarization. Similarly, when the other X-ray source and the other conductive strips 54 are energized, electroluminescence of the electroluminescent layer will be produced only in those areas substantially in registry with the conductive strips 54. Light passing through the light polarizing strips 96 will be polarized in a different plane and will be visible as a light image having that plane of polarization. The two images having the different planes of polarization may be separated by an observer wearing suitable light polarizing filters.

In the apparatus of Figs. 4–6 the light images are also intensified, thereby enabling better depth perception by the human eye.

The invention described herein provides means for producing brighter stereoscopic X-ray images without requiring higher intensity X-rays which would dangerously expose the patient, the examining physician, or the technician. It also provides more accurate and meaningful information as to the position and location of internal objects or organs in industrial or medical work.

What is claimed is:

1. Apparatus for producing intensified stereoscopic X-ray images of a specimen, said apparatus comprising screen means including superposed layers, one of said layers including a material having a variable impedance characteristic in response to X-ray excitation, another of said layers including electroluminescent phosphor material, electric field producing means connected across said layers, X-ray producing means arranged to project on said variable impedance layer two X-ray images formed by different angular projections of said X-rays through said specimen, said electroluminescent layer being formed of strips of different color emitting phosphors to render light images producible thereon in different colors with the details displaced relative to each other.

2. Apparatus for producing intensified stereoscopic X-ray images of a specimen, said apparatus comprising screen means including superposed layers, one of said layers including a material having a variable impedance characteristic in response to X-ray excitation, another of said layers including electroluminescent phosphor material, electric field producing means connected across said layers, X-ray producing means arranged to project on said variable impedance layer two X-ray images formed by different angular projections of said X-rays through said specimen, said electric field producing means including two sets of intermeshed light transparent electrically conductive strips disposed on said electroluminescent layer for rendering light images produced on said electroluminescent layer distinctly visible with the details displaced relative to each other, and means for selectively energizing said sets in synchronism with a selective energization of said X-ray producing means.

3. Apparatus for producing intensified stereoscopic X-ray images of a specimen, said apparatus comprising screen means including superposed layers, one of said layers including a material having a variable impedance characteristic in response to X-ray excitation, another of said layers including electroluminescent phosphor material, electric field producing means including a voltage source connected across said layers, said electric field producing means including two sets of intermeshed light transparent electrically conductive strips disposed on said electroluminescent layer, X-ray producing means arranged to project on said variable impedance layer two X-ray images formed by different angular projections of said X-rays on said specimen, and means for periodically switching said X-ray sources simultaneously with the switching of said conductive strip sets to said voltage source for rendering said X-ray images distinctly visible on said electroluminescent layer with the details of said images displaced relative to each other.

4. Apparatus for producing intensified stereoscopic X-ray images comprising screen means including two superposed layers, one of said layers including a material having a variable impedance characteristic in response to X-ray excitation, the other of said layers including electroluminescent phosphor material, electrode means disposed adjacent to the outer surfaces of said layers and including two sets of intermeshed transparent conductors adjacent to one of said surfaces, X-ray producing means including two X-ray sources arranged to project on said variable impedance layer two displaced X-ray images formed by different angular projections of said X-rays on a specimen, electric field producing means connected across said electrode means, and means for selectively energizing each set of said conductors respectively in synchronism with the selective energization of each of said X-ray sources.

5. The invention according to claim 4 wherein said electroluminescent layer includes two sets of different color light emitting phosphors in registering contact with said intermeshed conductors.

6. The invention according to claim 4 and further including two sets of different light color filter strips disposed between said intermeshed conductors and said electroluminescent layer.

7. The invention according to claim 4 and further including two sets of light polarizing filters having different planes of polarization, said polarizing filters being disposed between said intermeshed conductors and said electroluminescent layer.

8. Apparatus for producing intensified stereoscopic X-ray images of a specimen, said apparatus comprising screen means including superposed layers, one of said layers including a material having a variable impedance characteristic in response to X-ray excitation, another of said layers including electroluminescent material and being subdivided into elemental strip portions with adjacent portions capable of emitting light of different colors when subjected to an electric field, electric field producing means connected across said layers, X-ray producing means arranged to project on said variable impedance layer two X-ray images formed by different angular projections of said X-rays through said specimen to render light images producible in different colors with the details displaced relative to each other.

9. Apparatus for producing intensified stereoscopic X-ray images of a specimen, said apparatus comprising screen means including superposed layers, one of said layers including a material having a variable impedance characteristic in response to X-ray excitation, another of said layers including electroluminescent phosphor material, electric field producing means connected across said layers, X-ray producing means arranged to project on said variable impedance layer two X-ray images formed by different angular projections of said X-rays through said specimen, and means for rendering said X-ray images distinctly visible on said electroluminescent material with the details of said images displaced relative to each other, said last mentioned means including a plurality of different color light filter strips mounted adjacent to said electroluminescent layer.

10. An electroluminescent screen comprising two superposed layers, one of said layers being made of a material whose impedance is variable in response to X-ray excitation, the other of said layers comprising strips of electroluminescent phosphor, alternate ones of said strips being capable of emitting light of one color, the remaining strips being capable of emitting light of a different color, and an X-ray masking member mounted adjacent to said variable impedance layer, said masking member having X-ray permeable slits which are parallel to said strips.

References Cited in the file of this patent

UNITED STATES PATENTS

| Re. 21,964 | Leishman | Dec. 2, 1941 |
| 758,117 | Snook | Apr. 26, 1904 |
| 2,203,687 | Land et al. | June 11, 1940 |
| 2,555,545 | Hunter et al. | June 5, 1951 |
| 2,650,310 | White | Aug. 25, 1953 |
| 2,666,856 | Fua et al. | Jan. 19, 1954 |
| 2,687,360 | Michaels | Aug. 24, 1954 |
| 2,728,010 | Hegyi | Dec. 20, 1955 |
| 2,730,644 | Michlin | Jan. 10, 1956 |
| 2,757,103 | Briggs et al. | July 31, 1956 |
| 2,802,753 | Crosby et al. | Aug. 13, 1957 |